(12) United States Patent
Shin et al.

(10) Patent No.: US 6,396,177 B1
(45) Date of Patent: May 28, 2002

(54) STRUCTURE OF ROTOR FOR OUTER ROTOR TYPE BRUSHLESS MOTOR

(75) Inventors: Hyoun Jeong Shin; Jin Soo Park, both of Inchon; Ho Seon Rew; Sang Wook Hong, both of Seoul, all of (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 09/479,366

(22) Filed: Jan. 7, 2000

(30) Foreign Application Priority Data

Jan. 8, 1999 (KR) .............................................. 99-268
Jan. 21, 1999 (KR) .............................................. 99-1754
Mar. 31, 1999 (KR) .......................................... 99-11220

(51) Int. Cl.$^7$ .......................... H02K 21/22; H02K 9/06
(52) U.S. Cl. .................. 310/63; 310/67 R; 310/156.21; 310/156.26; 68/23.7
(58) Field of Search .......................... 310/62, 63, 67 R, 310/156.26, 156.21, 261, 42; 68/123.7

(56) References Cited

U.S. PATENT DOCUMENTS

| | | | | |
|---|---|---|---|---|
| 5,083,052 A | * | 1/1992 | Ochi | 310/64 |
| 5,497,040 A | * | 3/1996 | Sato | 310/67 R |
| 5,659,216 A | * | 8/1997 | Bisantz | 310/156 |
| 5,942,821 A | * | 8/1999 | Shin | 310/67 R |
| 6,049,930 A | * | 4/2000 | Hisano et al. | 8/159 |
| 6,091,172 A | * | 7/2000 | Kakinuma et al. | 310/71 |

FOREIGN PATENT DOCUMENTS

| | | | | |
|---|---|---|---|---|
| JP | 57-040354-a | * | 3/1982 | 310/67 R |
| JP | 60-197136-a | * | 10/1985 | 310/62 |
| JP | 61-236350-a | * | 10/1986 | 310/67 R |
| JP | 4-38149-a | * | 2/1992 | 310/52 |
| JP | 7-059315-a | * | 3/1995 | 310/67 R |
| JP | 8--019229-a | * | 1/1996 | 310/67 R |
| JP | 10-210727-a | * | 8/1998 | 310/67 R |

\* cited by examiner

*Primary Examiner*—Karl Tamai
(74) *Attorney, Agent, or Firm*—Ostrolenk, Faber, Gerg & Soffen, LLP (57) ABSTRACT

The present invention relates to a structure of a rotor for a brushless motor which can improve structural stiffness, restrict noise generation by reducing vibration during the rotation, use cheap materials, reduce a fabrication cost by fabricating a back yoke and a base plate unit in a single body, improve durability, and efficiently cool a heat generated in the motor during the operation by facilitating an external air inflow. The structure of the rotor for the brushless motor includes: a steel plate frame provided with a base plate unit in a disc shape having a plurality of insertion holes at its center portion, a plurality of radiation holes being formed at a circumferential portion of the insertion holes, a plurality of blades being formed at side portions of the radiation holes by cutting: a back yoke unit curved and extended in the upward direction, having a predetermined height at the circumferential portion of the base plate unit; and a radius-direction enhancing unit formed at the upper end portion of the back yoke unit; one or a plurality of ring type permanent magnets fixedly connected to the inner side portion of the back yoke unit; a connecting member inserted into the insertion hole positioned at the center, and connected to the steel plate frame; and a fixing unit fixing a driving shaft inserted into the connecting member and connected to the other constitutional elements.

22 Claims, 8 Drawing Sheets

STRUCTURE OF ROTOR FOR OUTER ROTOR TYPE BRUSHLESS MOTOR

BACKGROUND OF THE INVENTION

1. Field of the Invention

The present invention relates to a structure of a rotor for an outer rotor type brushless motor (BLDC), and in particular to a structure of a rotor for an outer rotor type brushless motor (BLDC) which can improve structural stiffness, restrict noise generation by reducing vibration during the rotation, efficiently cool a heat generated in the motor, decrease a fabrication cost and improve durability.

2. Description of the Background Art

Figure 1:
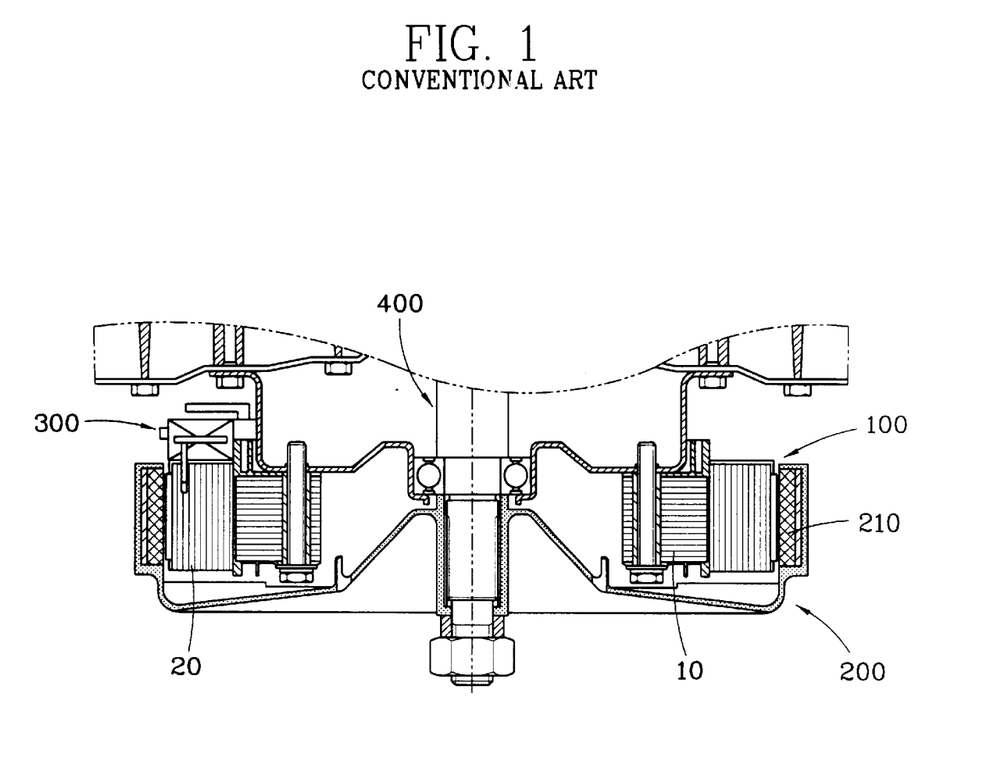
FIG. 1 is a front cross-sectional view illustrating a conventional outer rotor type brushless motor (BLDC)

As illustrated in FIG. 1, a general outer rotor type brushless motor (BLDC) includes: a stator 100 where a coil is wound round a magnetic core 10; a resin frame 220 in a predetermined shape fabricated with a resin by using a die; a rotor 200 positioned outside the stator 100 in order to be alternately rotated in the right and left directions; and a sensor unit 300 connected to the stator 100, detecting a position of a permanent magnet 210 of the rotated rotor 200. and sequentially transmitting a current to the stator 100.

A driving shaft 400 is inserted into a center portion of the rotor 200.

The structure of the rotor 200 will now be described in more detail.

Figure 2A:
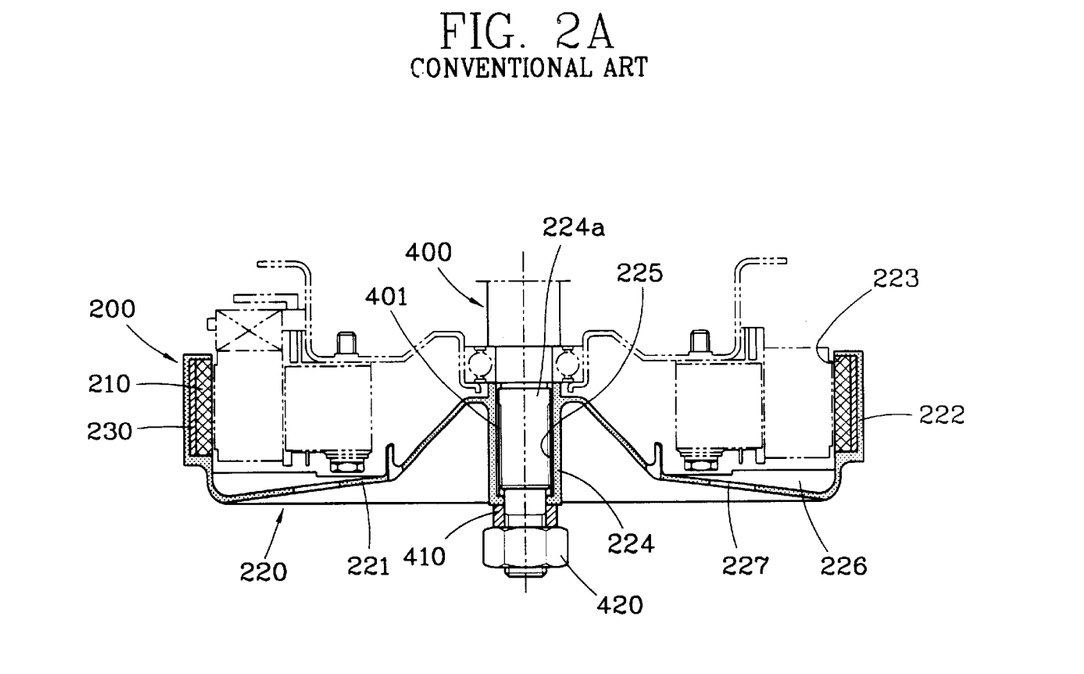
FIG. 2a is a front cross-sectional view illustrating a structure of a rotor for the conventional outer rotor type brushless motor.
Figure 2B:
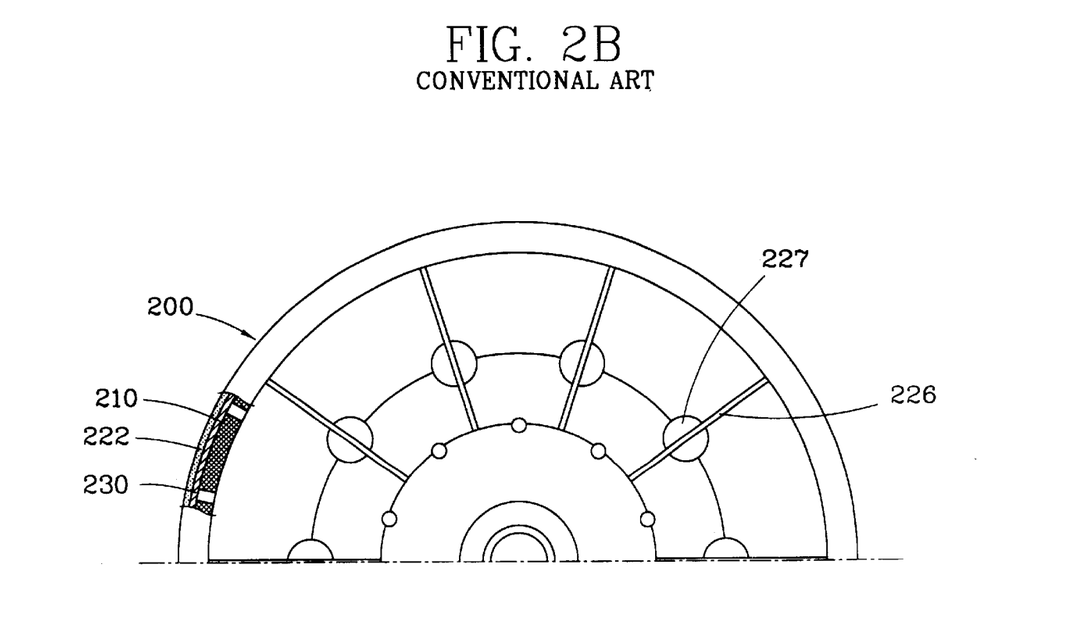
FIG. 2b is a plan view illustrating the structure of the rotor for the conventional outer rotor type brushless motor.

As depicted in FIGS. 2a and 2b, in the conventional outer rotor type brushless motor, the resin frame 220 forming an outer shape of the rotor 200 is formed having a predetermined height, a permanent magnet supporting unit 222 connected with the permanent magnet 210 being vertically curved and extended in an upward direction, and curved toward the center portion, at the outer circumferential portion to a disc-shaped base unit 221.

A ring-shaped deposition groove 223 having a predetermined height and width is formed at the inner wail of the permanent magnet supporting unit 222. A ring-shaped back yoke 230 having a predetermined width is inserted into the deposition groove 223. The plurality of permanent magnets 210 are stacked and adhered to the inner side portion of the back yoke 230 at predetermined intervals in a circumference direction.

The back yoke 230 is fabricated by rolling a thin steel plate. and serves to form a magnetic circuit of the permanent magnet 210. The back yoke 230 and the permanent magnet 210 are formed in a single body by a thermoplastic resin.

On the other hand, a boss unit 224 having a predetermined height is formed at the center portion of the base unit 221. A through hole 224a is formed at the center portion of the boss unit 224. A serration unit 225 having a plurality of triangle-shaped teeth is formed at the inner circumferential surface of the through hole 224a.

A shaft serration unit 401 formed at the outer circumferential surface of the driving shaft 400 is inserted into the serration unit 225 of the resin frame 220, and thus the resin frame 220 and the driving shaft 400 are combined. A spacer 410 is inserted into the lower portion of the shaft serration unit 401 inserted into the serration unit 225 of the resin frame 220. A nut 420 is fastened to a lower portion of the spacer 410, namely an end portion of the driving shaft 400.

On the other hand, a radiation fan blade 226 and a radiation hole 227 are provided on the bottom surface of the base unit 221 in order to cool a heat which is always generated during the rotation of the rotor 200 by means of an external air inflow.

As shown in FIG. 2b, a plurality of radiation blades 226 are formed in the base unit 221 in a radial shape centering around the boss unit 224. The plurality of radiation blades 226 have a predetermined thickness and width, and are formed in a vertical direction from the boss unit 224 to the permanent magnetic supporting unit 222.

In addition, a plurality of radiation holes 227 are formed in the base unit 221 at predetermined intervals in a circumferential direction. The plurality of radiation holes 227 are positioned to form a concentric circle, and cross the radiation blades 226.

In the above-described rotor 200, the permanent magnets 210 are positioned having a predetermined space from the stator 100. The driving shaft 400 connected to the resin frame 220 is fixedly connected to other constitutional elements.

In the conventional outer rotor type brushless motor, when a current sequentially flows to the coil 20 wound round the stator 100, the rotor 200 is rotated according to interaction between the current flowing in the coil 20 and the permanent magnet 210. The rotation force of the rotor 200 is transmitted to other constitutional elements through the driving shaft 400.

For example, in case the outer rotor type brushless motor adapts to a washing machine, the stator 100 is deposited in an outer casing including an inner casing, the driving shaft 400 is connected to the inner casing of the washing machine, and thus the driving force of the rotor can be transmitted to the devices such as the washing machine through the driving shaft 400.

During the rotation of the rotor 200, the air flows into the motor by the radiation fan blades 226 and the radiation holes 227, thereby cooling the heat generated in the motor.

Figure 3A:
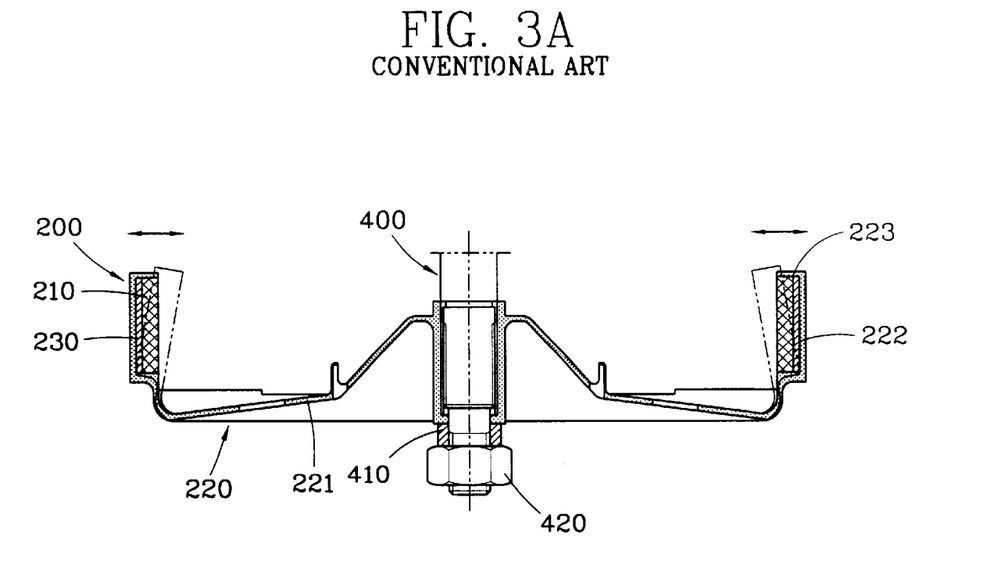
FIG. 3a is a front cross-sectional view illustrating a state where the rotor is vibrated in a radius direction during the driving of the conventional outer rotor type brushless motor.
Figure 3B:
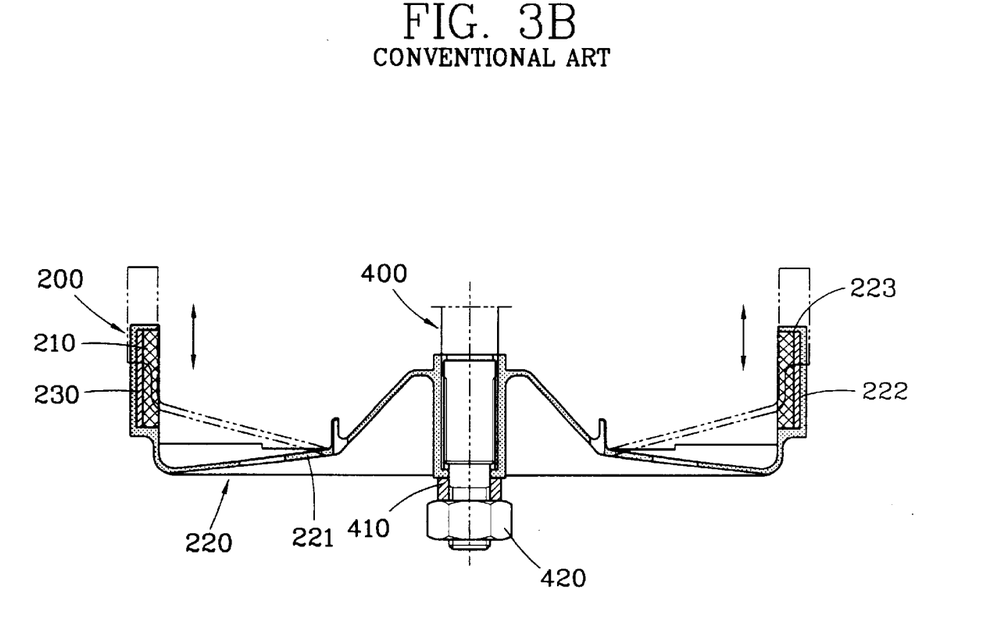
FIG. 3b is a front cross-sectional view illustrating a state where the rotor is vibrated in a shaft direction during the driving of the conventional outer rotor type brushless motor.

However, while rotated by the interaction force with the current applied to the winding coil of the stator, as depicted in FIGS. 3a and 3b, the rotor for the conventional outer rotor type brushless motor is vibrated in a shaft direction and a radius direction.

The vibration is generated because the resin frame connected with the permanent magnet consists of the resin, and thus stiffness of the material is weak (approximately 15% of the steel plate). Especially, the vibration of the resin frame resulting from the vibration in the radius direction increases noise.

Moreover, since the frame consists of the resin, the serration unit of the frame connected to the driving shaft transmitting the driving force generated from the rotor is easily abraded under the operational conditions of high temperature, high torque and impact load, and thus a life span thereof is reduced.

In addition, the radiation fan blades for cooling the inside of the motor with the external air are formed in a vertical direction. Therefore, when the rotor is rotated in one direction, an amount of the air which flows into the motor and is discharged therefrom is increased. As the thermal conductivity of the resin is low, radiation is not efficient.

Furthermore, the frame consisting of the resin is very weak to a fatigue destruction resulting from a repeated stress generated by alternation of the washing machine. Accordingly, the radiation holes must be formed small. However, the small radiation holes cannot sufficiently perform a cooling operation. As a result, when the cooling operation is ill-performed, a resistance of the coil is increased, motor efficiency is reduced, a temperature of the coil is more increased, and thus the coil may be easily damaged. Consequently, an expensive coil of high quality must be used.

The resin frame consists of the resin, and thus a price thereof is relatively high. Also, it is necessary to separately fabricate and connect the back yoke in order to form the magnetic circuit, which results in increased production and assembly costs.

SUMMARY OF THE INVENTION

Accordingly, it is a primary object of the present invention to provide a structure of a rotor for a brushless motor (BLDC) which can improve structural stiffness, reduce noise by restricting generation of vibration, use cheap materials, reduce a fabrication cost by forming a back yoke and a base plate unit in a single body, and improve durability.

It is another object of the present invention to provide a structure of a rotor for a brushless motor (BLDC) which can efficiently cool a heat generated in a motor during the operation by promoting inflow of an external air.

In order to achieve the above-described objects of the present invention, there is provided a structure of a rotor for an outer rotor type brushless motor (BLDC), including: a steel plate frame provided with a base plate unit in a disc shape having a plurality of insertion holes at its center portion, a plurality of radiation holes being formed at a circumferential portion of the insertion holes, a plurality of blades being formed at side portions of the radiation holes by cutting, a back yoke unit curved and extended in the upward direction, having a predetermined height at the circumferential portion of the base plate unit, and a radius-direction enhancing unit formed at the upper end portion of the back yoke unit; one or a plurality of ring type permanent magnets fixedly connected to the inner side portion of the back yoke unit; a connecting member inserted into the insertion hole positioned at the center, and connected to the steel plate frame; and a fixing unit fixing a driving shaft inserted into the connecting member and connected to the other constitutional elements.

BRIEF DESCRIPTION OF THE DRAWINGS

The present invention will become better understood with reference to the accompanying drawings which are given only by way of illustration and thus are not limitative of the present invention, wherein:

FIG. 5b is a cross-sectional view illustrating another embodiment of FIG. 5a;

FIG. 7b is a cross-sectional view illustrating another embodiment of FIG. 7a;

DETAILED DESCRIPTION OF THE PREFERRED EMBODIMENTS

A structure of a rotor for an outer rotor type brushless motor (BLDC) in accordance with preferred embodiments of the present invention will now be described with reference to the accompanying drawings.

Here, the identical constitutional elements to the conventional art are provided with the same reference numerals.

Figure 4A:
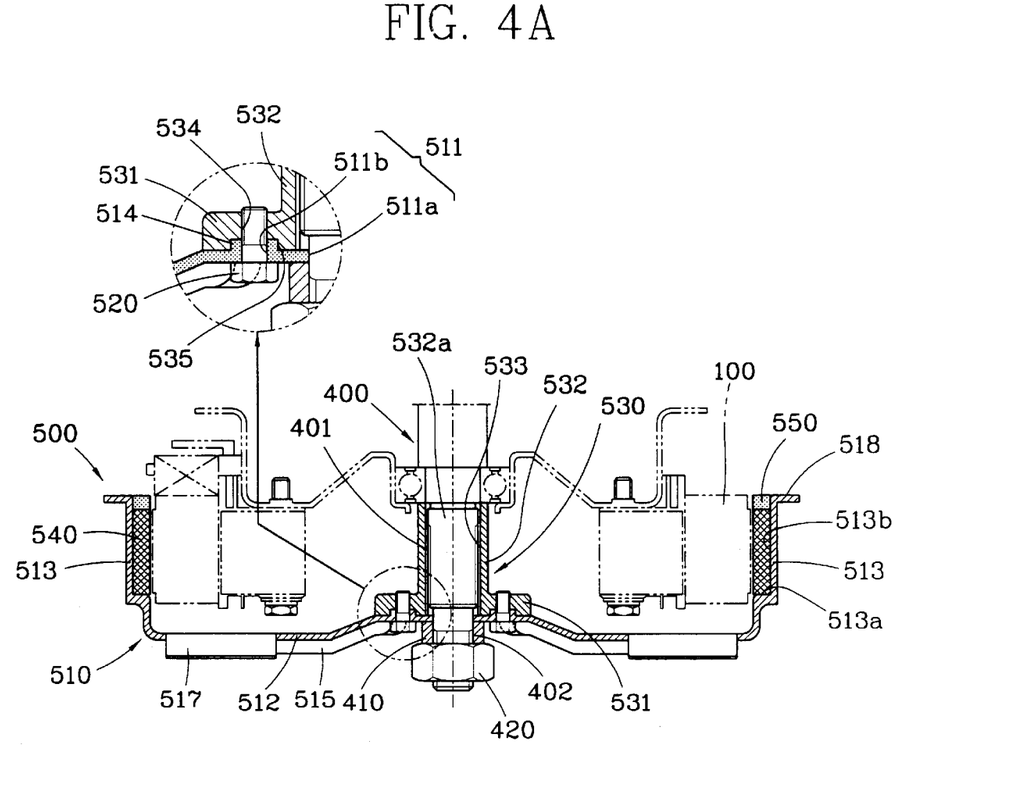
FIG. 4a is a front cross-sectional view illustrating the structure of the rotor for the outer rotor type brushless motor in accordance with the present invention.
Figure 4B:
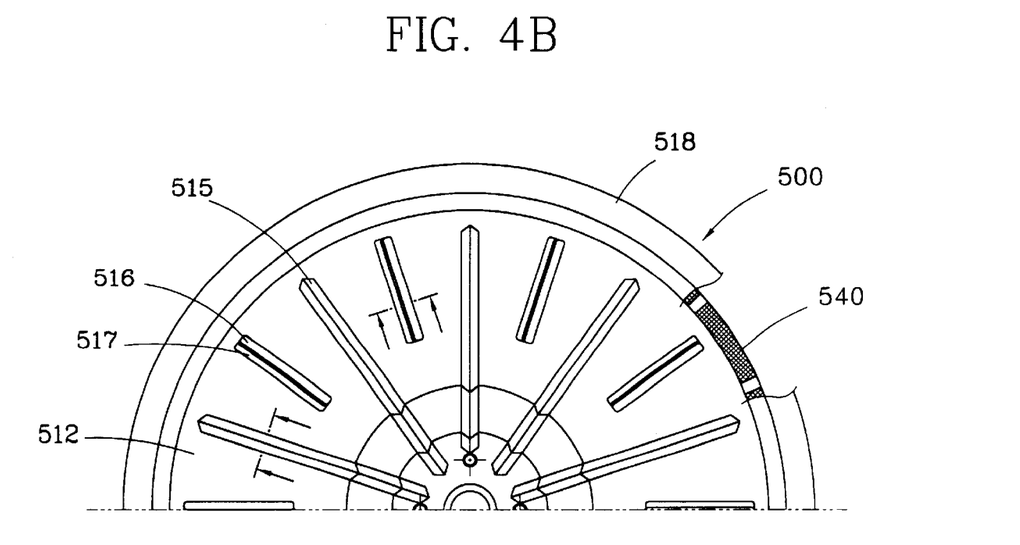
FIG. 4b is a plan view illustrating the structure of the rotor for the outer rotor type brushless motor in accordance with the present invention.
Figure 4C:
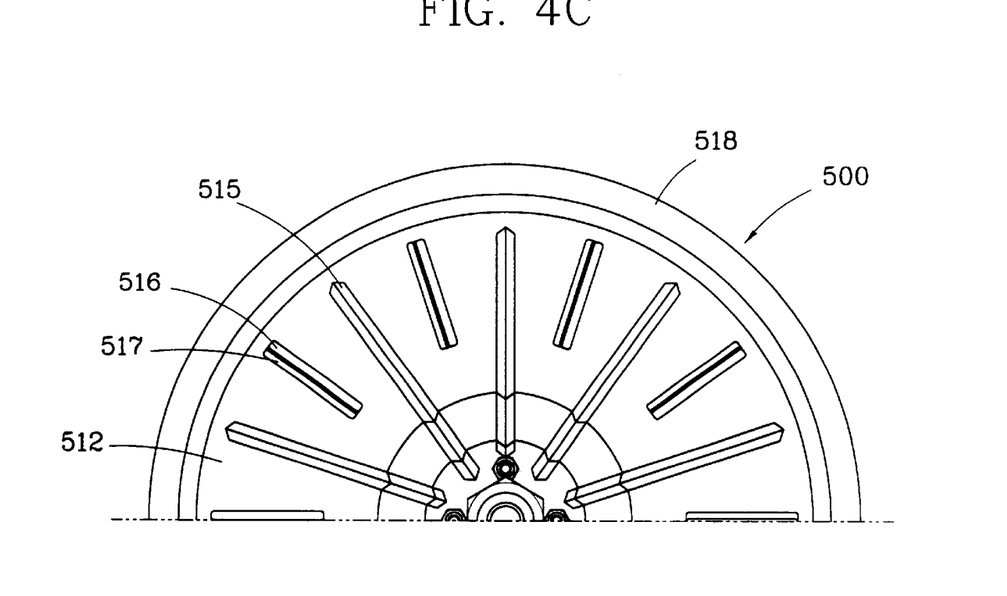
FIG. 4c is a bottom view illustrating a structure of a rotor for an outer rotor type brushless motor in accordance with a preferred embodiment of the present invention.

As illustrated in FIGS. 4a to 4c, the rotor for the outer rotor type brushless motor in accordance with the present invention includes a steel plate frame 510 in a cylinder shape having a plurality of insertion holes 511 at its center portion, an upper portion of which being opened. A back yoke unit 513 is curved and extended in the upward direction, having a predetermined height at the outer circumferential portion of a base plate unit 512, a plurality of permanent magnets 520 being fixedly connected to an inner side portion of the back yoke unit 513.

The base plate unit 512 is formed in a disc shape, a center portion of which being protruded in the upward direction, making an irregular shape with peripheral portions.

The plurality of insertion holes 511 are formed at the center portion, and include a shaft insertion hole 511a which a driving shaft 400 is inserted into; and a plurality of fastening member insertion holes 511b which are formed at the outer circumferential portion of the shaft insertion hole 511a, and which a fastening member 520 is inserted into.

On the other hand, a connection guide unit 514 is protrusively formed in the upward direction at the outer circumferential portion of the fastening member insertion hole 511b in the base plate unit 512, so that a connecting member 530 fastened to the steel plate frame 510 by the fastening member 520 can be easily connected to the base plate unit 512.

The connecting member 530 consists of a steel material, and is fixedly connected to the steel plate frame 510.

As depicted in FIGS. 4b and 4c, in order to increase a natural frequency of the rotor 500, a plurality of enhancing ribs 515 which are longitudinally embossed in a radius direction are formed in a radial shape at a predetermined portion of the base plate unit 512.

The enhancing ribs 515 serve to prevent generation of resonance with other constitutional elements during the driving of the rotor 500.

Figure 5A:
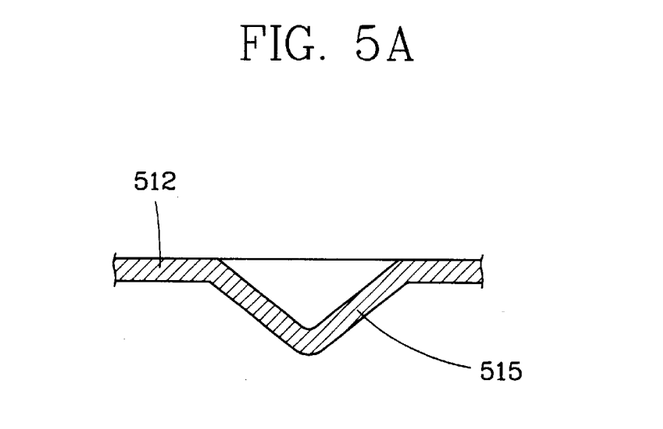
FIG. 5a is a cross-sectional view illustrating an enhancing rib formed on the rotor for the outer rotor type brushless motor in accordance with the present invention.
Figure 5B:
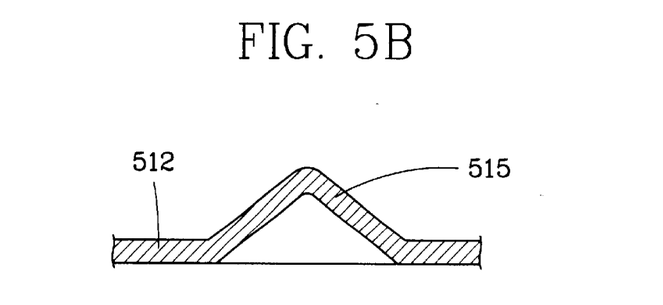

As illustrated in FIGS. 5a and 5b, the end portion of the enhancing rib 515 is advantageously formed in an isosceles triangle shape. The embossing direction is protruded toward the upper or lower portion of the base plate unit 512.

In addition, a plurality of radiation holes 516 are formed at the outer circumferential portions of the plurality of insertion holes 511 formed at the center portion of the base plate unit 512. A blade 517 for guiding an air inflow by rotation of the rotor 500 is formed at the side portions of the respective radiation holes 516.

The radiation hole 516 and the blade 517 may be formed by a press process at the same time, or the blade 517 may be adhered after forming the radiation hole 516. One or more radiation holes 516 and blades 517 are formed between the enhancing ribs 515 at predetermined intervals.

Figure 6:
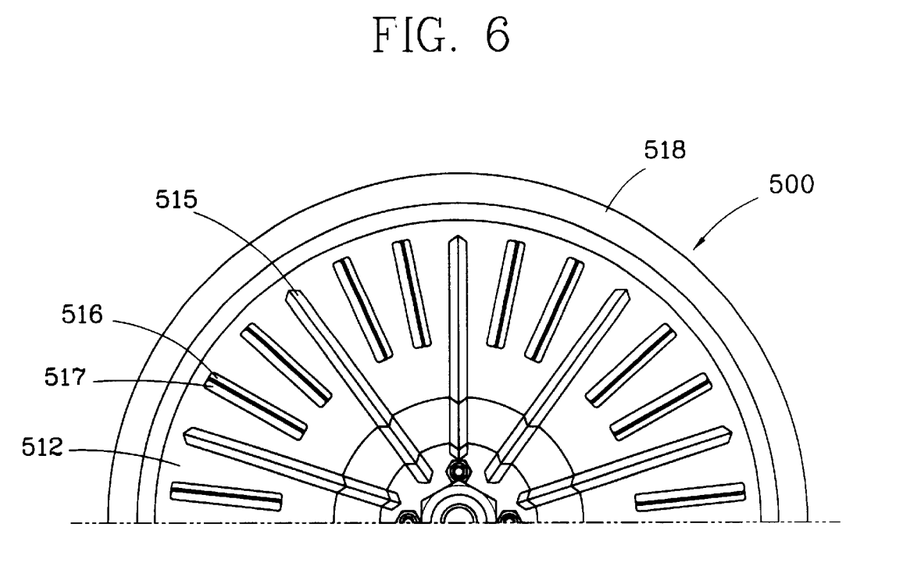
FIG. 6 is a bottom view illustrating another embodiment of FIG. 4C.

According to a preferred embodiment as shown in FIG. 4c, one radiation hole 516 and one blade 517 are formed between the enhancing ribs 515. According to another embodiment as shown in FIG. 6, two radiation holes 516 and two blades 517 are formed between the enhancing ribs 515.

In general, it is preferable that the radiation holes 516 are formed in a maximum number so long as the structural stiffness of the base plate unit 512 is maintained, and thus maximizes an amount of air flowing into the motor.

The shape of the radiation hole 516 will now be described in detail. The radiation hole 516 is longitudinally formed in a radius direction at the base plate unit 512. The blade 517 is fixed after an edge of a cutting portion of the radiation hole 516 is rotated by a predetermined angle.

Figure 7A:
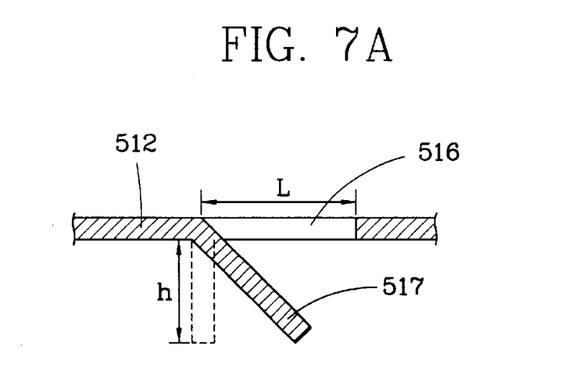
FIG. 7a is a cross-sectional view illustrating radiation holes and blades formed on the rotor for the outer rotor type brushless motor in accordance with the present invention.
Figure 7B:
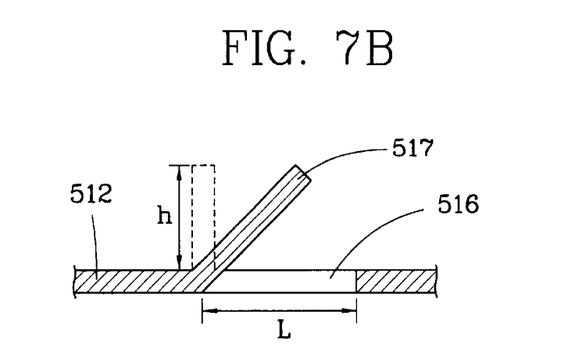

In more detail, as illustrated in FIGS. 7a and 7b, in order to form the radiation hole 516, a predetermined portion of the base plate unit 512 is cut in the radius direction. The cutting portion is rotated by a predetermined length (h), centering around a portion corresponding to a length (L) to the circumferential direction of the radiation hole 516, and fixed, thereby forming the blade 517.

In every embodiment, it is advantageous to form the plurality of blades 517 to be sloped in the same direction, and to form a width of the radiation hole 516 to be equal to or greater than a height of the blade 517 (h/L≦1). In addition, the blade 517 slopes toward the inner or outer side of the stator coil 20. Here, an angle of slope is preferably between 60° and 90° in regard to the surface of the base plate unit 512. as shown in FIGS. 7a and 7b.

FIG. 7a shows a state where the blade 517 is fixedly sloped toward the stator coil 20, and FIG. 7b shows a state where the blade 517 is fixedly sloped away therefrom. In the former, a large amount of air flows into the motor, but an accident may take place during components assembly. In the latter, an amount of air flowing into the motor is more or less small, but an accident is prevented.

In order to receive one or more ring-shaped permanent magnets 540 in the circumferential direction at predetermined intervals, a jaw 513a having a predetermined width in a horizontal direction and a contact surface 513b extended in a vertical direction to the jaw 513a are formed at the inner surface of the back yoke unit 513.

The permanent magnets 540 are positioned on the jaw 513a, contacted with the contact surface 513b, and fixedly connected to the back yoke unit 513 by an adhesive or, by positioning a resin for adhesion 550 at their upper portions.

In order to enhance stiffness of the steel plate frame 510 in the radius direction, a radius-direction enhancing unit 518 vertically curved and extended in the outward direction is formed at the upper end portion of the back yoke unit 513.

Figure 8:
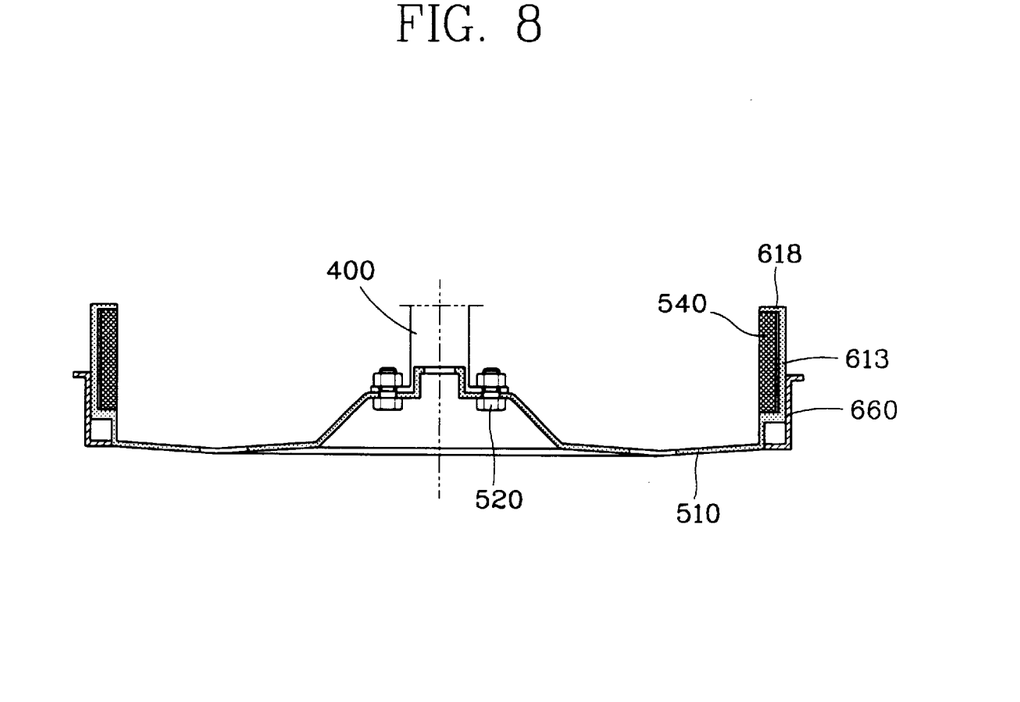
FIG. 8 is a front cross-sectional view schematically illustrating a first example of a support frame connected to an outer circumferential portion of a back yoke unit of the rotor of the outer rotor type brushless motor in accordance with the present invention.

In accordance with a second embodiment of the present invention, as shown in FIG. 8, in order to more enhance stiffness in the radius direction, a radius-direction enhancing unit 618 is inwardly curved at an upper portion of a region supporting the magnets 540, thereby supporting the magnets 540 by an elastic force of the base plate unit 512. In addition, in order to enhance stiffness of the base plate unit 512 consisting of a steel material in the radius direction, a support frame 660 is provided at the outer portion of the base plate unit 512, and an upper end portion thereof is horizontally curved and extended in the outward direction.

That is to say, the support frame 660 is curved several times, thus partially surrounding the outsides of the bottom and side portions of the back yoke unit 613. The upper end portion thereof is outwardly curved and extended.

Figure 9:
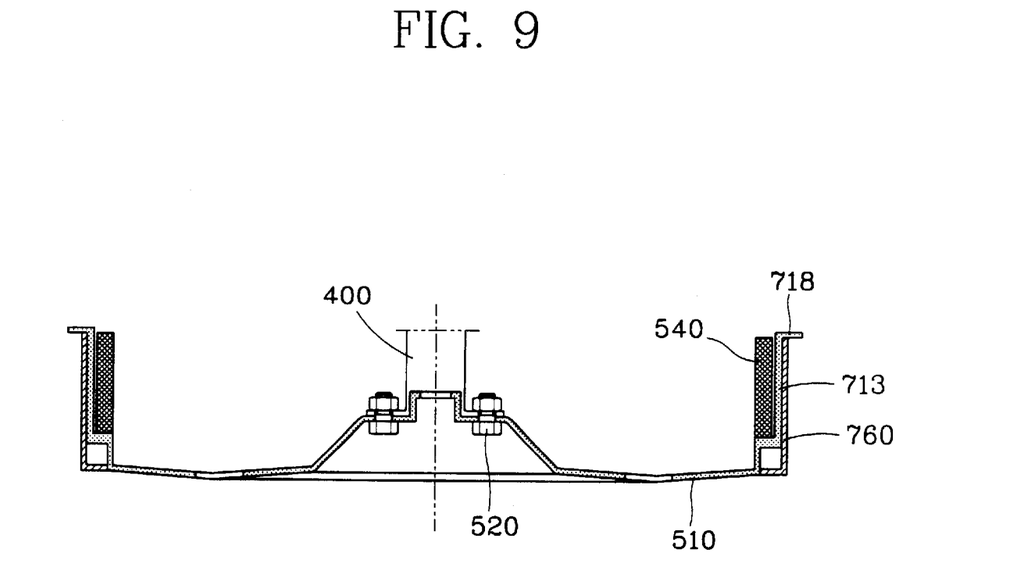
FIG. 9 is a front cross-sectional view schematically illustrating a second example of the support frame in FIG. 8.

On the other hand, in accordance with a third embodiment of the present invention, as illustrated in FIG. 9, a radius-direction enhancing unit 718 is vertically curved and extended in the outward direction at the upper end portion of a back yoke unit 713, and a support frame 760 is curved, thereby surrounding the whole outsides of the bottom and side portions of the back yoke unit 713.

Figure 10:
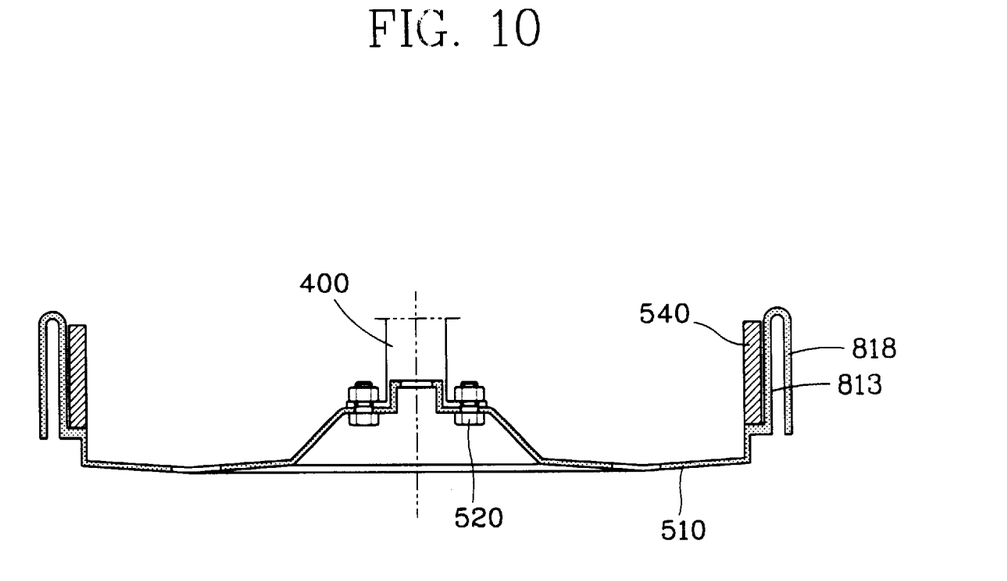
FIG. 10 is a front cross-sectional view schematically illustrating a third example of the support frame in FIG. 8.

In accordance with a fourth embodiment of the present invention, as shown in FIG. 10, a radius-direction enhancing unit 818 is extendedly formed in a reverse U shape in the outward direction at the upper end portion of the back yoke unit 813.

Figure 11:
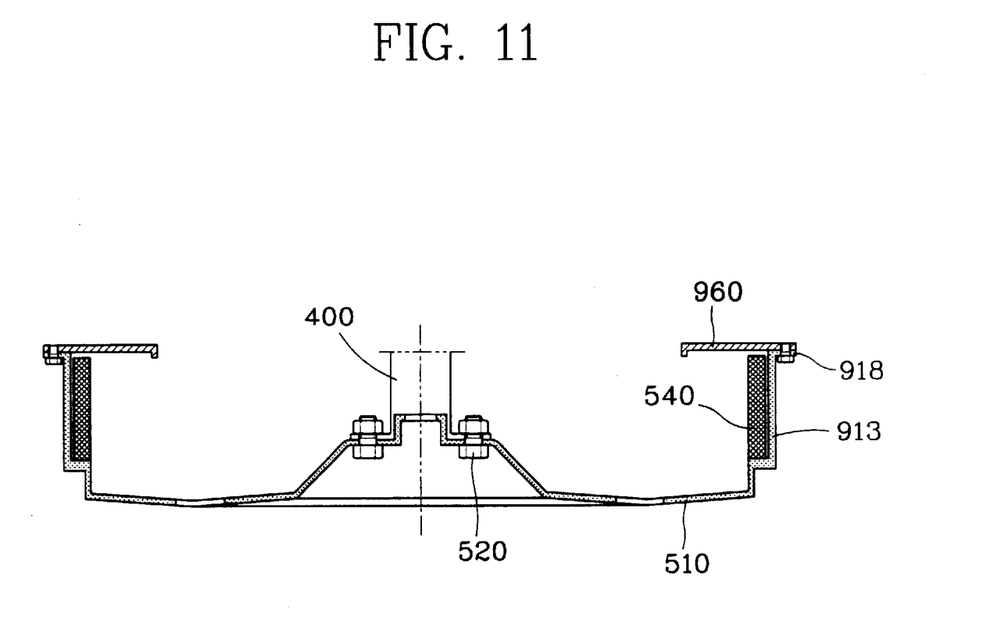
FIG. 11 is a front cross-sectional view schematically illustrating a fourth example of the support frame in FIG. 8.

According to a fifth embodiment of the present invention. as depicted in FIG. 11, a radius-direction enhancing unit 918 is vertically curved and extended in the outward direction at the upper end portion of the back yoke unit 913, and a support frame 960 is formed in a disc shape with its center portion empty, as if covering the upper circumferential portion of the steel plate frame 512, facing an inner portion thereof.

As described above, the support frame in accordance with the respective embodiments of the present invention is protrusively formed in the inward or outward direction of the base plate unit 512, thereby sufficiently enhancing the stiffness in the radius direction.

On the other hand, the connecting member 530 includes: a ring-shaped flange unit 531 having a predetermined thickness and area; a boss unit 532 upwardly extended at the center portion of the flange unit 531, and having a predetermined outside diameter and height; a serration hole 533 formed at an inner circumferential portion of a through hole 532a formed at the boss unit 532 in upper and lower directions, and engaged with the shaft serration unit 401 formed at the driving shaft 400; and a plurality of connecting member combining units 534 formed at the flange unit 531, and fastened to the fastening member 520.

The plurality of connecting member combining units 534 formed at the flange unit 531 are screw holes making a concentric circle shape.

A guide hole 535 which the connection guide unit 514 formed at the upper portion of the base plate unit 512 is inserted into is formed having a predetermined depth at the lower portion of the connecting member combining unit 534.

On the other hand, although not illustrated in the drawings, a specific guide pin may be formed in the connection guide unit 514.

The fastening unit 520 includes a plurality of bolts. The bolts are passed through the fastening unit insertion holes 511b, and thereafter fastened to the connecting member combining unit 534, thereby connecting the connecting member 530 to the base plate unit 512 of the steel plate frame 510. A specific nut may be fastened to the fastening unit 520.

The shaft serration unit 401 is formed at the outer circumferential portion of the driving shaft 400 transmitting the rotation force of the rotor 500 in order to be engaged with the serration hole 533 of the connecting member 530, and a male screw unit 402 is formed at the lower portion thereof.

The driving shaft 400 is connected to the serration hole 533 of the connecting member 530 connected to the steel plate frame 510. At the same time, the spacer 410 is inserted into the end portion of the driving shaft 400, and the nut 420 which is a fixing unit is fastened to the male screw unit 402, thereby fixedly connecting the driving shaft 400 to the steel plate frame 510.

The assembly process of the rotor for the outer rotor type brushless motor in accordance with the present invention will now be explained.

Firstly, the shape of the steel plate frame 510 is manufactured by a press. The permanent magnets 540 are positioned at the inner circumferential portion of the back yoke unit 513 of the steel plate frame 510. Thereafter. the permanent magnets 540 are fixedly adhered to the back yoke unit 513 by the adhesive or resin for adhesion 550.

The screw hole 534 which is the connecting member combining unit accords with the fastening unit insertion hole 511b of the base plate unit 512 of the steel plate unit 510, and a bolt which is the fastening unit 520 is fastened thereto, thereby connecting the connecting member 530 to the steel plate frame 510.

The shaft serration unit 401 of the driving shaft 400 is inserted into the serration hole 533 of the connecting member 530, the spacer 401 is inserted into the lower portion of the driving shaft 400, and the nut 420 is fastened to the male screw unit 402 of the driving shaft 400, thereby fixedly connecting the driving shaft 400, the steel plate frame 510 and the connecting member 530.

In accordance with the outer rotor type brushless motor of the present invention, the permanent magnets 540 composing the rotor 500 are positioned to surround the stator 100, and the driving shaft 400 is connected to other constitutional elements.

According to the outer rotor type brushless motor of the present invention, when a current is applied to the coil 20 composing the stator 100, the rotor 500 is rotated by the interaction force between the current flowing in the coil 20 and the permanent magnets 540, and the driving shaft 400 connected to the rotor 500 transmits the rotation force generated from the rotor 500 to the other constitutional elements.

In accordance with the present invention, the steel plate frame 510 consists of a steel material, and thus stiffness is relatively high. In addition, at the base plate unit of the steel plate frame 510, the enhancing rib 515 is formed in order to enhance stiffness in the shaft direction, and the radius-direction enhancing unit 518 is formed in order to enhance stiffness in the radius direction. The support frame is connected to the outer portion of the enhancing unit 518, thus increasing the structural stiffness and reducing the vibration. As a result, the noise generation is restricted.

Also, the blades 517 formed at the base plate unit 512 of the steel plate frame 510 are protrusively sloped in one direction, and thus the external air may smoothly flow into the motor during the rotation. Accordingly, the heat generated in the motor can be efficiently cooled.

Furthermore, the connecting member 530 connected to the driving shaft 400 is firmly fastened to the steel plate frame 510 by the bolt which is the fastening unit 520. Also, the material stiffness is high, and thus resists the high torque, impact load and high temperature. As a result, the components may not be abraded or damaged, and durability thereof is improved.

Moreover, the steel plate frame 510 and other components consist of a steel material, and thus a fabrication cost thereof is reduced by approximately 5 times, as compared with the resin in the conventional art. In addition, while the back yoke 230 is fabricated by rolling a thin steel plate in the conventional art, it is not specially fabricated, but formed in a single body with the steel plate frame 510 in accordance with the present invention.

As discussed earlier, the structure of the rotor for the outer rotor type brushless motor in accordance with the present invention increases the structural stiffness, and restricts generation of the vibration and nose during the operation, thereby improving reliability. In addition, the present invention efficiently cools the heat generated in the motor during the operation, thereby improving the efficiency of the motor. Moreover, the back yoke unit is not specially fabricated, but formed in a single body with the steel plate frame, thereby reducing the fabrication cost.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A structure of rotor for an outer rotor type brushless motor, comprising:
   a steel plate frame including:
      a base plate unit in a disc shape having:
         a plurality of insertion holes at its center portion;
         a plurality of radiation holes being formed at a circumferential portion of the insertion holes;
         a plurality of radially extending blades being formed at side portions of the radiation holes by cutting;
         a connection guide unit being protrusively formed adjacent a circumferential portion of a shaft insertion hole of the plurality of insertion holes;
         a plurality of enhancing ribs which are longitudinally embossed in a radial direction formed in intermediate between a center and an outer edge thereof;
      a back yoke unit curved at the edge portion of the base plate unit and formed integrally therewith and extended in the upward direction, having a predetermined height at an outer circumferential portion of the base plate unit; and
      a radius-direction enhancing unit formed radially extending outwardly at an upper end portion of the back yoke unit;
   one or a plurality of ring type permanent magnets fixedly connected to the inner side portion of the back yoke unit;
   a connecting member inserted into the shaft insertion hole of the plurality of insertion holes positioned at the center, and connected to the steel plate frame by a fastening member; and a fixing unit fixing a driving shaft inserted into the connecting member which connected to the other constitution elements.

2. The structure according to claim 1, wherein a jaw having a predetermined width in a horizontal direction and a contact surface extended in a vertical direction to the jaw are formed at an inner surface of the back yoke unit.

3. The structure according to claim 2, wherein the permanent magnets are positioned on the jaw, contacted with the contact surface, and fixedly connected to the back yoke unit by an adhesive or by positioning a resin for adhesion at their upper portions.

4. The structure according to claim 1, wherein the plurality of insertion holes are formed at the center portion of the base plate unit, and comprise the shaft insertion hole which the driving shaft is inserted into, and a plurality of fastening member insertion holes which are formed at the outer circumferential portion of the shaft insertion hole, and a fastening member is inserted into.

5. The structure according to claim 4, wherein a connection guide unit is protrusively formed in the upward direction at the outer circumferential portion of the fastening member insertion hole.

6. The structure according to claim 1, wherein the connecting member comprises:

a ring-shaped flange unit having a predetermined thickness and area;

a boss unit upwardly extended at the center portion of the flange unit, and having a predetermined outside diameter and height;

a serration hole formed at an inner circumferential portion of a through hole formed at the boss unit in upper and lower directions, and engaged with a shaft serration unit formed at the driving shaft; and a plurality of connecting member combining units formed at the flange unit and fastened to the fastening member.

7. The structure according to claim 6, wherein a guide hole which the connection guide unit protrusively formed at adjacent a circumferential portion of a shaft insertion hole of the plurality of insertion holes which inserted into is reamed having a predetermined depth at the lower portion of the connecting member combining unit.

8. The structure according to claim 1, wherein a cross-section of the enhancing ribs is symmetric in the radius direction.

9. The structure according to claim 1, wherein an embossing direction of the enhancing ribs is protruded inwardly toward a stator coil.

10. The structure according to claim 1, wherein an embossing direction of the enhancing ribs is protruded outwardly away from where a stator coil is located.

11. The structure according to claim 1, wherein a plurality of enhancing ribs embossed and longitudinally formed in a radial shape are formed in the radius direction at a predetermined portion of the base plate unit, and one or more radiation holes and blades are formed between the enhancing ribs.

12. The structure according to claim 1, wherein the plurality of radiation holes are longitudinally formed in the radius direction of the base plate unit.

13. The structure according to claim 12, wherein a width of the radiation holes is equal to or greater than a height of the blades.

14. The structure according to claim 1, wherein the respective blades are sloped inwardly or outwardly toward or away from a stator coil.

15. The structure according to claim 14, wherein a slope angle of each of the blades is between 85° and 95° relative to the surface of the base plate unit.

16. The structure according to claim 1, wherein the radius-direction enhancing unit is vertically curved and extended in the outward direction at the upper end portion of the back yoke unit.

17. The structure according to claim 1, wherein the radius-direction enhancing unit is extendedly formed in a reverse U shape in the outward direction at the upper end portion of the back yoke unit.

18. The structure according to claim 1, wherein a support frame is connected to the outer portion of the back yoke unit.

19. The structure according to claim 18, wherein a radius-direction enhancing unit is inwardly curved and extended at the upper portion of the back yoke unit, and thus the permanent magnets are supported by an elastic force of the back yoke unit itself.

20. The structure according to claim 18, wherein the support frame is curved several times, and thus partially surrounds the outsides of the bottom and side portions of the back yoke unit.

21. The structure according to claim 18, wherein a radius-direction enhancing unit is vertically curved and extended in the outward direction at the upper end portion of the back yoke unit, and the support frame is curved, and thus surrounds the whole outsides of the bottom and side portions of the back yoke unit.

22. The structure according to claim 18, wherein the radius-direction enhancing unit is vertically curved and extended in the outward direction at the upper end portion of the back yoke unit, and the support frame is formed in a disc shape with its center portion empty, as if covering the upper circumferential portion of the steel plate frame, facing an inner portion thereof.

* * * * *